(12) United States Patent
Young

(10) Patent No.: US 7,753,393 B2
(45) Date of Patent: Jul. 13, 2010

(54) HITCH ASSISTANCE SYSTEM

(76) Inventor: Troy Eugene Young, 547 W. 3900 South, Suite C, Salt Lake City, UT (US) 84123

( * ) Notice: Subject to any disclaimer, the term of this patent is extended or adjusted under 35 U.S.C. 154(b) by 55 days.

(21) Appl. No.: 12/275,070

(22) Filed: Nov. 20, 2008

(65) Prior Publication Data

US 2009/0127824 A1 May 21, 2009

Related U.S. Application Data

(60) Provisional application No. 60/989,224, filed on Nov. 20, 2007.

(51) Int. Cl.
*B60D 1/36* (2006.01)
(52) U.S. Cl. .................. 280/477; 280/490.1; 280/504; 280/508; 280/511; 116/28 R
(58) Field of Classification Search ............... 280/477, 280/490.1, 491.2, 495, 504, 508, 511; 116/28 R
See application file for complete search history.

(56) References Cited

U.S. PATENT DOCUMENTS

| 3,702,029 | A | * | 11/1972 | Anderson, Jr. ............... 33/264 |
| 4,054,302 | A | | 10/1977 | Campbell |
| D270,906 | S | | 10/1983 | Orr |
| 4,666,176 | A | * | 5/1987 | Sand ........................... 280/477 |
| 4,723,788 | A | | 2/1988 | Suter |
| 5,035,441 | A | | 7/1991 | Murray |
| D331,900 | S | * | 12/1992 | Simmen ..................... D12/162 |
| D332,595 | S | * | 1/1993 | Randolph ................... D12/162 |
| D342,226 | S | * | 12/1993 | Rahn .......................... D12/162 |
| 5,269,554 | A | | 12/1993 | Law et al. |
| 5,478,101 | A | | 12/1995 | Roberson |
| 5,558,352 | A | * | 9/1996 | Mills .......................... 280/477 |
| 5,711,245 | A | * | 1/1998 | Knirck ...................... 116/28 R |
| 6,139,041 | A | * | 10/2000 | Murphy ..................... 280/477 |
| 6,273,448 | B1 | * | 8/2001 | Cross ......................... 280/477 |
| 6,341,794 | B1 | | 1/2002 | Hunter |
| 6,517,098 | B2 | * | 2/2003 | Grasso et al. ............... 280/477 |
| 6,585,281 | B1 | | 7/2003 | Voorting |
| 6,612,603 | B2 | | 9/2003 | Alger |
| D491,846 | S | * | 6/2004 | Summerhill ............... D12/162 |
| 6,764,091 | B1 | * | 7/2004 | Grasso et al. ............... 280/477 |
| 6,827,363 | B1 | * | 12/2004 | Amerson ..................... 280/477 |
| 6,834,878 | B2 | * | 12/2004 | Koestler ..................... 280/477 |
| 6,863,294 | B1 | | 3/2005 | Bonham |

(Continued)

*Primary Examiner*—Lesley Morris
*Assistant Examiner*—Tashiana Adams
(74) *Attorney, Agent, or Firm*—Advantia Law Group; Michael W. Starkweather

(57) ABSTRACT

A hitch assistance system including a tow ball position indicator; wherein the tow ball position indicator includes a base member having a gripping member, a bias member, and an extension member. The tow ball position indicator also includes a telescoping staff coupled to the extension member and an indicating member. The system includes a hitch position indicator configured to facilitate knowing a position of a hitch, wherein the hitch position indicator includes a base member configured to couple to a hitch. The base member includes a coupling member, a flared extension extending upwardly and outwardly, and a bias member, wherein the bias member is configured to bias the arms against contraction such that the flared extensions of the coupling member is disposed within an interior of a hitch and thereby couple thereto. The base member includes an extension member, a telescoping staff, and an indicator includes an indicating member.

18 Claims, 6 Drawing Sheets

U.S. PATENT DOCUMENTS

| | | | |
|---|---|---|---|
| 6,916,109 B2 * | 7/2005 | Julicher | 362/487 |
| D510,894 S * | 10/2005 | Bordelon | D12/162 |
| 7,431,318 B1 * | 10/2008 | Frades | 280/477 |
| 7,637,226 B1 * | 12/2009 | Bradley | 116/28 R |
| 2002/0070529 A1 * | 6/2002 | Dravecz | 280/477 |

* cited by examiner

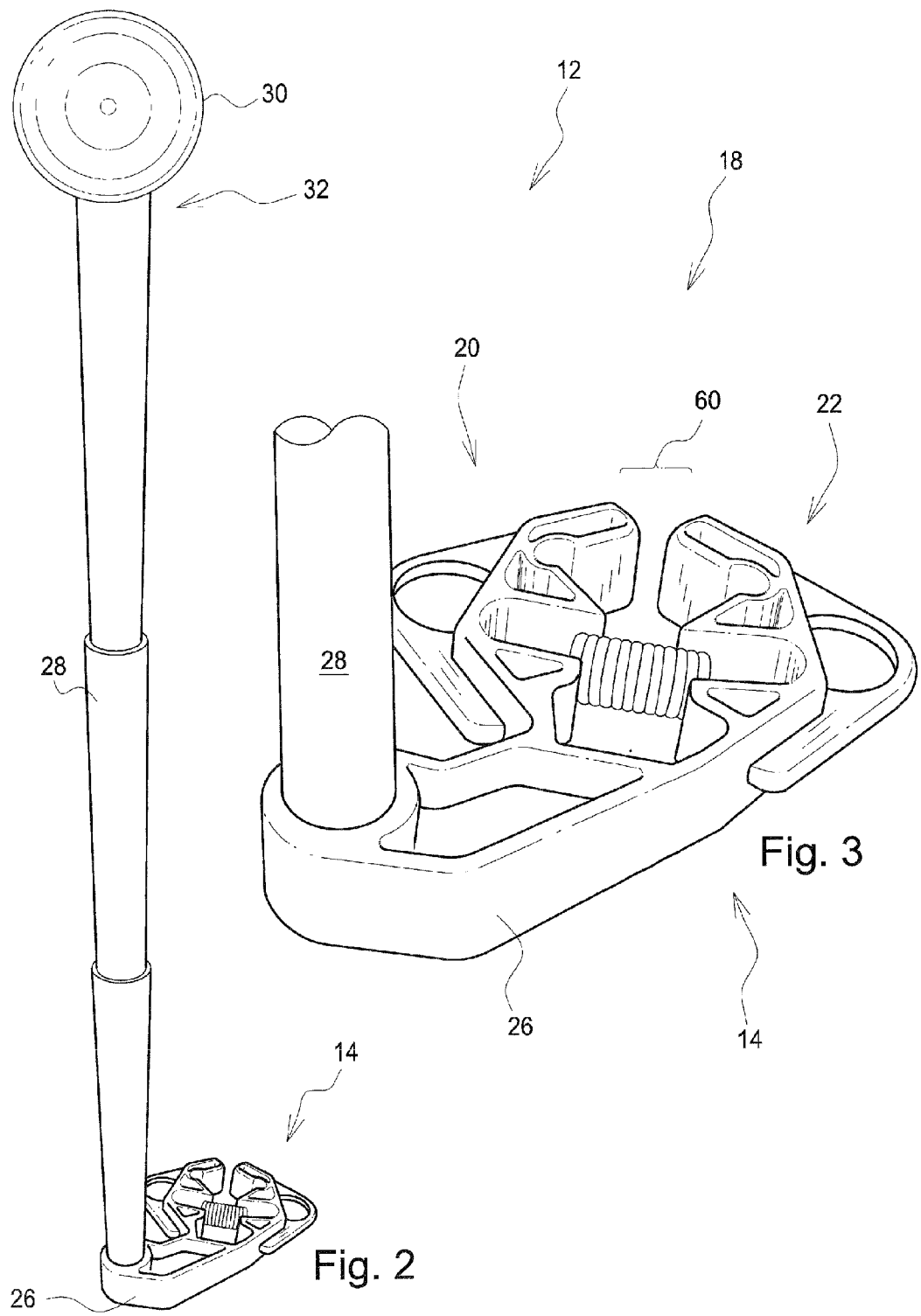

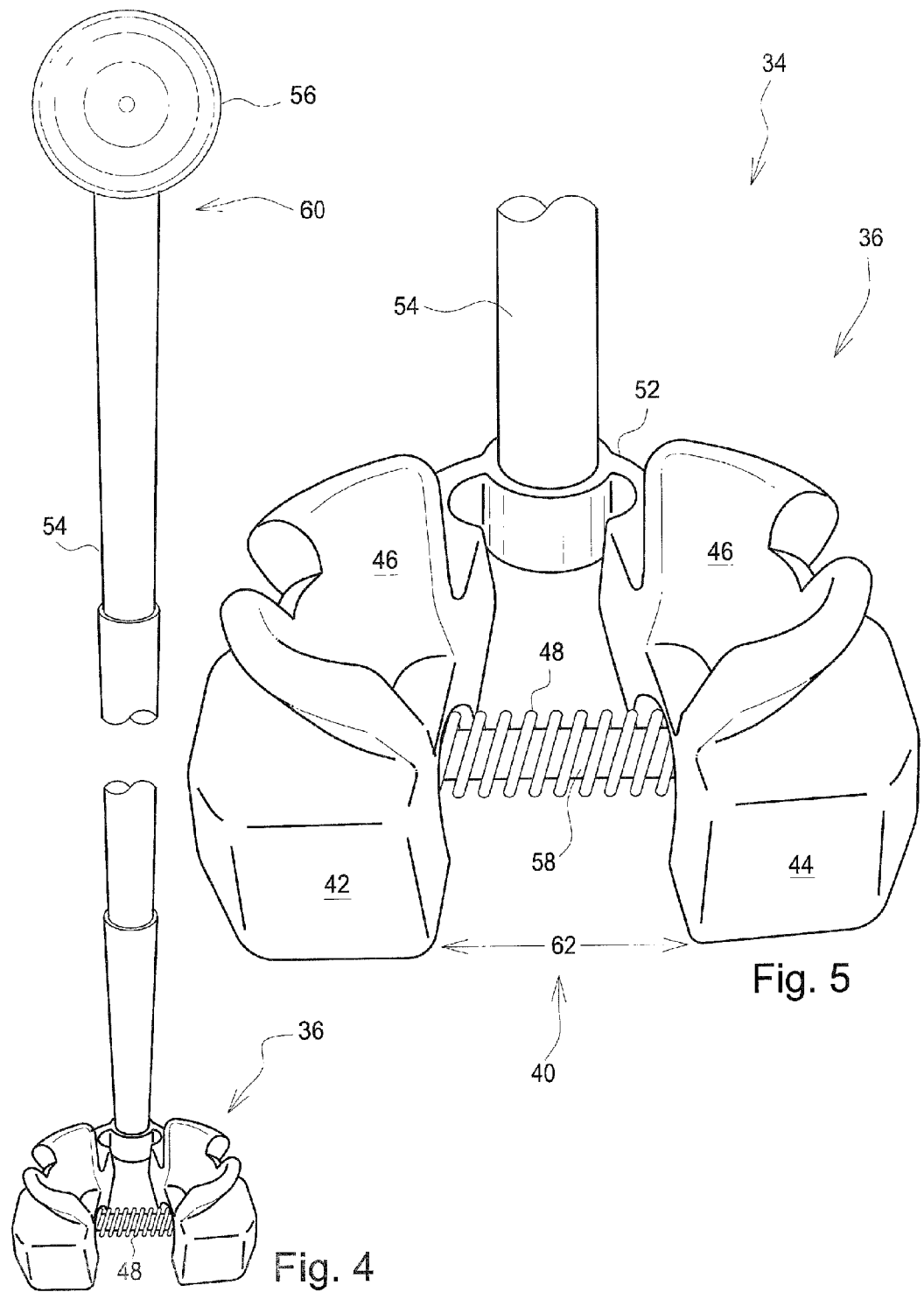

HITCH ASSISTANCE SYSTEM

CROSS-REFERENCE TO RELATED APPLICATIONS

This invention claims priority, under 35 U.S.C. §120, to the U.S. Provisional Patent Application No. 60/989,224 to Troy Eugene Young filed on Nov. 20, 2007, which is incorporated by reference herein.

BACKGROUND OF THE INVENTION

1. Field of the Invention

The present invention relates to vehicle attachment devices, specifically a hitch assistance system.

2. Description of the Related Art

There has always been a problem with attaching a trailer hitch to the towing ball by oneself. The towing ball mounted on the rear of the towing vehicle is not visible from the driver's seat. In addition, as the user reverses the towing vehicle towards the trailer hitch, the trailer hitch also becomes not visible to the user. Typically a user has another person positioned at the rear of the towing vehicle to guide the driver to position the towing ball substantially about the trailer hitch. However, it is often difficult to position or attach a trailer to a towing vehicle without the assistance of another person. Some improvements have been made in the field. Examples of references related to the present invention are described below, and the supported teachings of each reference are incorporated by reference herein:

U.S. Pat.: No. 4,723,788, issued to Suter, discloses an apparatus for facilitating the alignment of a trailer hitch socket with the ball mounted on the towing vehicle is provided wherein a couple of inter-fitting masts are used. The first mast mounts atop the socket on the trailer tongue and extends vertically upward high enough to the point which it is visible from the towing vehicle. The second mast has a collar to engage it on the ball of the trailer hitch attached to the towing vehicle. It also extends upwardly to a height at which it is visible from within the towing vehicle. As the vehicle backs up toward the trailer, the driver can see the two masts and steer such that they will come closer and closer together and finally nest together when the socket is directly over the ball.

U.S. Pat. No.: 6,341,794, issued to Hunter, discloses a trailer hitch alignment apparatus comprises a first guide member removably attached to a vehicle bumper and a second guide member removably attached to a trailer hitch socket. The first guide member includes a magnetic base with a telescopically extensible rod adjustably coupled thereto. The second guide member includes a magnetic base having an upwardly extending telescopic rod and a downwardly extending semi-flexible shaft attached thereto. The shaft extends downwardly through a bore defined by the trailer hitch tongue so as to contact the trailer hitch ball when the ball and socket are aligned. Contact between the shaft and ball causes vertical displacement of the shaft and guide rod. Therefore, the two telescopic guide rods, visible from a driver's seat, facilitates lateral alignment of the ball and socket while vertical displacement of the second rod indicates perfect forward alignment.

U.S. Pat. No.: 5,558,352, issued to Mills, discloses a trailer hitch alignment device which allows the driver of a vehicle to align the hitch of the driven vehicle with that of its trailer with no aid from another individual. The invention utilizes two masts having acrylic flags attached thereto mounted upon the hitch components of the respective vehicles to provide visual reference points for the driver. The acrylic flags are bright in color which allow them to be sufficiently illuminated by the reverse lights of the towing vehicle during times of darkness, thereby making night-time hitch alignment possible. Each mast is mounted to a hitch component via a dome-shaped base having several magnets underneath. The magnets provide the attraction force necessary to mount the masts to the hitch components and the shape of the mounting bases provide the bases with the ability to mounted upon virtually any hitch configuration. The mountings are further secured through the use of velcro-type straps which extend from the mounting bases to the hitch components. This enhances stability and, therefore, performance, of the invention when alignment is required over rough terrain or high winds. The invention further has a swing arm offset bracket to allow for the mounting of the masts on towing vehicles having spare tires mounted on their rear.

U.S. Pat. No.: 6,517,098, issued to Grasso et al., discloses an alignment device to align a vehicle's trailer hitch ball neck assembly with a trailer hitch socket assembly or tongue assembly. The present invention includes two units, each having uprights with engaging press on members. The ball neck upright member has a "C"-shaped bottom portion for frictionally engaging the neck of the trailer hitch ball neck, and the hitch engaging upright member has a "U"-shaped bottom portion for frictionally engaging the outer housing of the hitch socket member around its lower end periphery. When used in conjunction with each other, the two poles visually assist the vehicle operator in aligning the vehicles so that they may be easily coupled together for towing.

U.S. Pat. No.: 6,764,091, issued to Grasso et al., discloses an alignment device to align a vehicle's trailer hitch ball neck assembly with a trailer hitch socket assembly or tongue assembly. The present invention includes two units, each having uprights with engaging press on members. The ball neck upright member has a "C"-shaped bottom portion for frictionally engaging the neck of the trailer hitch ball neck, and the hitch engaging upright member has a "U"-shaped bottom portion for frictionally engaging the outer housing of the hitch socket member around its lower end periphery. When used in conjunction with each other, the two poles visually assist the vehicle operator in aligning the vehicles so that they may be easily coupled together for towing. The uprights are constructed of subunits that can be easily dissembled after use for compact storage.

U.S. Pat. No.: 5,269,554, issued to Law et al., discloses an alignment guide includes a plurality of guide assemblies, one of which is mounted to a trailer hitch ball and the other mounted to a trailer tongue, wherein the guides each include telescoping vertical leg members for alignment and communication relative to one another for the positioning of a trailer hitch tongue relative to an associated trailer ball.

U.S. Design Pat. No.: D270,906, issued to Orr, discloses an ornamental design for a visual aid unit for trailer hitch alignment.

U.S. Design Pat. No.: D331,900, issued to Simmen, discloses an ornamental design for a trailer hitch alignment guide.

The inventions heretofore known suffer from a number of disadvantages which include being difficult to use, being limited in adaptability, inherent inaccuracies, difficulties in attaching to a hitch and/or tow ball, failing to remain properly coupled to a hitch and/or tow ball, being limited in application, being expensive, and being breakable.

What is needed is a hitch assistance system that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available hitch assistance systems. Accordingly, the present invention has been developed to provide an efficient and effective hitch assistance system.

In one embodiment of the invention, there is a hitch assistance system configured to be disposed about the trailer hitch and towing attachment to assist in attaching a trailer to a vehicle. The system may include a tow ball position indicator configured to facilitate knowing a position of a vehicle's towing ball. The tow ball position indicator may include a base member configured to couple to a vehicle's towing ball. The base member may include a gripping member having a first arm and a second arm pivotally coupled one to the other and a bias member coupled between the arms. The bias member may be configured to bias the arms against expansion such that the arms of the gripping member may be disposed on opposite sides of a base of a towing ball and thereby couple thereto. The base member may also include an extension member extending diagonally outward from the gripping member substantially along the plane of the gripping member. The tow ball position indicator may also include a telescoping staff coupled to the extension member and extending upwardly therefrom. The tow ball position indicator may further include an indicating member disposed about a top portion of the telescoping member.

The hitch assistance system may also include a hitch position indicator configured to facilitate knowing a position of a hitch, wherein the hitch position indicator may include a base member configured to couple to a hitch. The base member may include a coupling member having a first arm and a second arm pivotally coupled one to the other. In addition, the base member may also include a flared extension extending upwardly and outwardly from each arm, and a bias member coupled between the arms and configured to bias the arms against contraction such that the flared extensions of the coupling member may be disposed within an interior of a hitch and thereby couple thereto. The base member may further include an extension member extending diagonally outward from the gripping member substantially along the plane of the gripping member. The hitch position indicator may also include a telescoping staff coupled to the extension member and extending upwardly therefrom. Furthermore, the hitch position indicator may include an indicating member disposed about a top portion of the telescoping member.

The hitch assistance system may further include indicating members, wherein the indicating member may be glow in the dark balls; in addition, the indicating member of the tow ball position indicator is substantially smaller than the indicating member of the hitch position indicator. Furthermore, the telescoping staff of the tow ball position indicator may be shorter than the telescoping staff of the hitch position indicator when each is fully extended. In particular, the telescoping staff of the tow ball position indicator may be about three inches shorter than the telescoping staff of the hitch position indicator when each is fully extended. The system may further include extension members, wherein each extension member may be sized such that a center of each telescoping staff is offset from a center of each corresponding base member in a substantially equal amount. Moreover, the arms of the coupling member and the arms of the gripping member may each pivotally couple through direct plastic coupling without mechanical hinges. Finally, each bias member may include a central support stump disposed therein and configured to facilitate proper orientation of the bias member.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIG. 2 is a rear perspective view of a tow ball position indicator of a hitch assistance system, according to one embodiment of the invention;

FIG. 3 is a rear perspective view of a base member of a tow ball position indicator, according to one embodiment of the invention;

FIG. 4 is a front perspective view of a hitch position indicator of a hitch assistance system, according to one embodiment of the invention;

FIG. 5 is a front perspective view of a base member of a hitch position indicator, according to one embodiment of the invention;

DETAILED DESCRIPTION OF THE INVENTION

Figure 1:
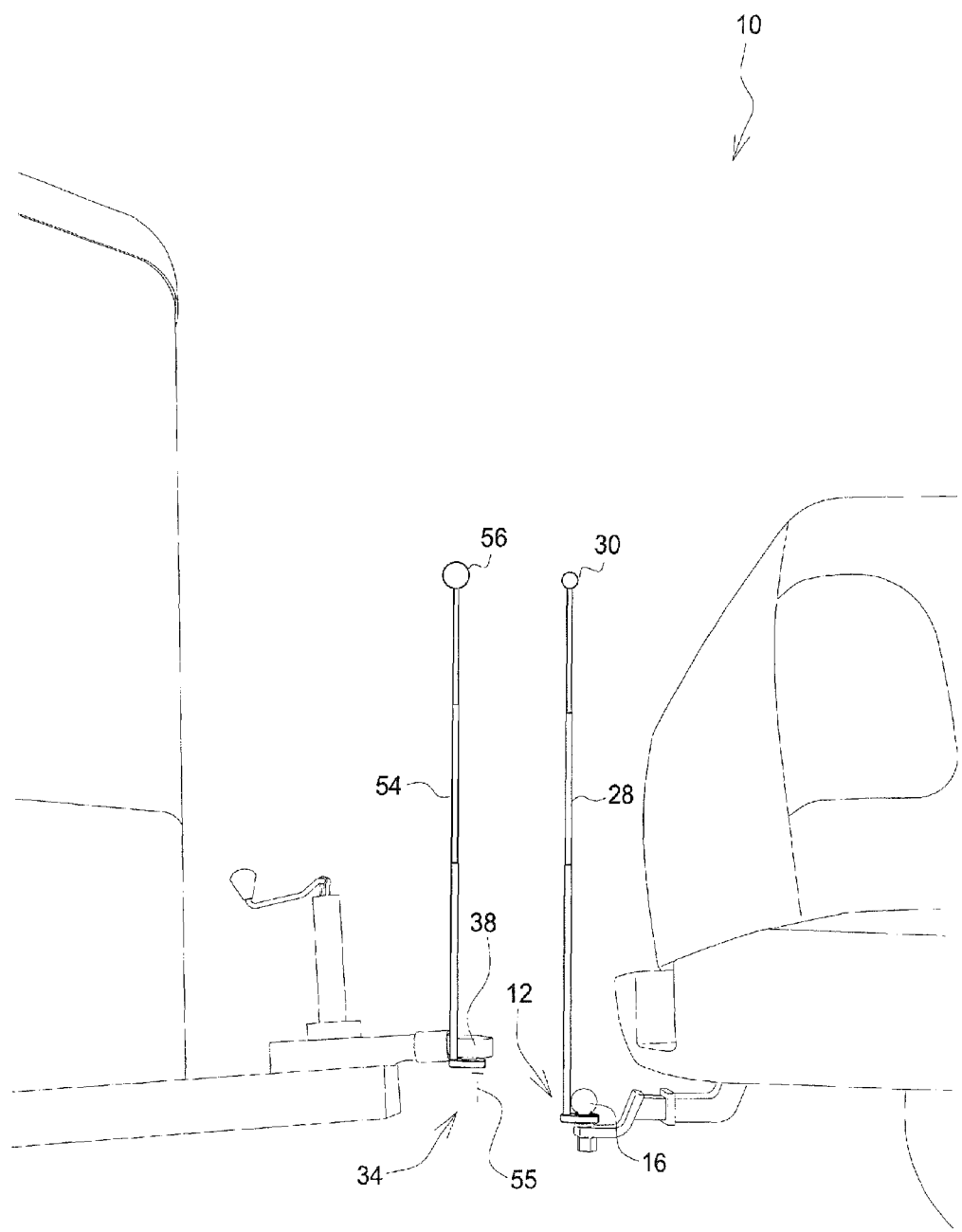
FIG. 1 is a side elevational view of a hitch assistance system, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 illustrates a side elevational view of a hitch assistance system 10, according to one embodiment of the invention, wherein the system 10 includes a tow ball position indicator 12 of a hitch assistance system 10. The tow ball position indicator 12 is configured to facilitate knowing a position of a vehicle's towing ball. The tow ball position indicator 12 includes a base member 14 configured to couple to a vehicle's towing ball 16. The tow ball position indicator 12 also includes a telescoping staff 28 coupled to the base member 14. The tow ball position indicator 12 further includes an indicating member 30 disposed about a top portion 32 of the telescoping member 28.

FIG. 1 also illustrates a hitch assistance system 10, according to one embodiment of the invention, wherein the system 10 also including a hitch position indicator 34 configured to facilitate knowing a position of a hitch. The hitch position indicator 34 includes a base member 36 configured to couple to a hitch 38. The hitch position indicator 34 also includes a telescoping staff 54 coupled to the base member 36. Furthermore, the hitch position indicator 34 includes an indicating member 56 disposed about a top portion 60 of the telescoping member 54. The indicating member 30 of the tow ball position indicator 12 is substantially smaller than the indicating member 56 of the hitch position indicator 34. Accordingly, when the two indicating members are aligned a viewer may be able to see both simultaneously. Furthermore, the telescoping staff 28 of the tow ball position indicator 12 is shorter than the telescoping staff 54 of the hitch position indicator 34 when each is fully extended. Accordingly, the indicating members may be vertically aligned despite a desired vertical misalignment of hitch and tow ball. In one embodiment, the telescoping staff 28 of the tow ball position indicator 12 is about three inches shorter 55 than the telescoping staff 54 of the hitch position indicator 34 when each is fully extended.

In operation of one embodiment of the invention, a user couples the base member 14 of a tow ball position indicator 12 to a towing ball 16. Then the user couples the base member 36 of the hitch position indicator 34 to the hitch 38; wherein the base member 14 of the tow ball position indicator 12 is substantially orientated in the same position as the base member 36 of the hitch position indicator 34. In addition, the base member 14 of the tow ball position indicator 12 is substantially about 3 inches below the base member 36 of the hitch position indicator 34. The user then extends the telescoping staffs 28, 54 of the tow ball position indicator 12 and the hitch position indicator 34. The user then aligns the indicator ball 30 of the tow ball position indicator 12 with the indicator ball 56 of the hitch position indicator 34. The user then positions the towing vehicle's towing ball below the trailer hitch by aligning the indicating member 30 of the tow ball position with the indicating member 56 of the hitch position indicator.

FIGS. 2 and 3 illustrate a rear perspective view of a tow ball position indicator 12 of a hitch assistance system 10, according to one embodiment of the invention, wherein the tow ball position indicator 12 is configured to facilitate knowing a position of a vehicle's towing ball. The tow ball position indicator 12 includes a base member 14 configured to couple to a vehicle's towing ball. The base member 14 includes a gripping member 18 having a first arm 20 and a second arm 22 pivotally coupled one to the other and a bias member 24 coupled between the arms 20, 22. The bias member 24 is configured to bias the arms 20, 22 against expansion such that the arms 20, 22 of the gripping member 18 is disposed on opposite sides of a base of a towing ball and thereby couple thereto. The first arm 20 and the second arm 22 are disposed substantially apart, wherein the first arm 20 is disposed a distance 70 smaller than the width of a base of a towing ball apart from the second arm 22. The base member 14 further includes an extension member 26 extending diagonally outward from the gripping member 18 substantially along the plane of the gripping member 18. The tow ball position indicator 12 also includes a telescoping staff 28 coupled to the extension member 26 and extending upwardly therefrom. The tow ball position indicator also includes an indicating member 30 disposed about a top portion 32 of the telescoping member 28.

In operation of one embodiment of the invention, a user couples the tow ball position indicator 12 to a vehicle's towing ball, by disposing the base of the towing ball in between the first arm 20 and the second arm 22 of the gripping member 18. The bias member 24 of the gripping member 18 is configured to expand around the base 23 of the towing ball 16, thereby coupling the tow ball position indicator 12 to the towing ball 16. The user then positions the extension member 26 about a side of the vehicle's towing ball 16, thereby disposing the indicating member 30 to one side of the towing ball 16.

FIGS. 4 and 5 a front perspective view of a hitch position indicator 34 of a hitch assistance system 10, according to one embodiment of the invention, wherein the hitch position indicator 34 is configured to facilitate knowing a position of a hitch. The hitch position indicator 34 includes a base member 36 configured to couple to a hitch. The base member 36 includes a coupling member 40 having a first arm 42 and a second arm 44 pivotally coupled one to the other. In addition, the base member 36 includes a flared extension 46 extending upwardly and outwardly from each arm 42, 44, and a bias member 48 coupled between the arms 40, 42 and configured to bias the arms 40, 42 against contraction such that the flared extensions 46 of the coupling member 40 is disposed within an interior cavity of a hitch and thereby couple thereto. The first arm 42 and the second arm 44 are disposed substantially apart, wherein the flared extension 46 of first arm 42 is disposed at a distance 62 larger than the width of the interior of a tow hitch from the flared extension 46 of the second arm 44. The base member 36 further includes an extension member 52 extending diagonally outward from the coupling member 40 substantially along the plane of the coupling member 40. The hitch position indicator 34 also includes a telescoping staff 54 coupled to the extension member 52 and extending upwardly therefrom. Furthermore, the hitch position indicator 34 further includes an indicating member 56 disposed about a top portion 60 of the telescoping member 54. Finally, each bias member may include a central support stump disposed therein and configured to facilitate proper orientation of the bias member.

In operation of one embodiment of the invention, a user couples a hitch position indicator 34 to a trailer's hitch 38, by disposing the flared extensions 46 of the first arm 42 and the second arm 44 about the interior 50 of the trailer hitch 38. The user presses the first arm 42 and the second arm 44 towards each other and disposes the flared extensions 46 within the interior 50 of a trailer hitch 38 and releases the coupling member 40. The bias member 48 is configured to expand the flared extensions 46 to contact the interior surface of the trailer hitch 38, thereby securing the coupling member 40 within the trailer hitch 38. The user then positions the extension member 52 about either side of the trailer hitch, matching the position of the tow ball position indicator disposed about the towing ball, thereby disposing the indicating member 56 to one side of the trailer hitch 38.

Figure 6:
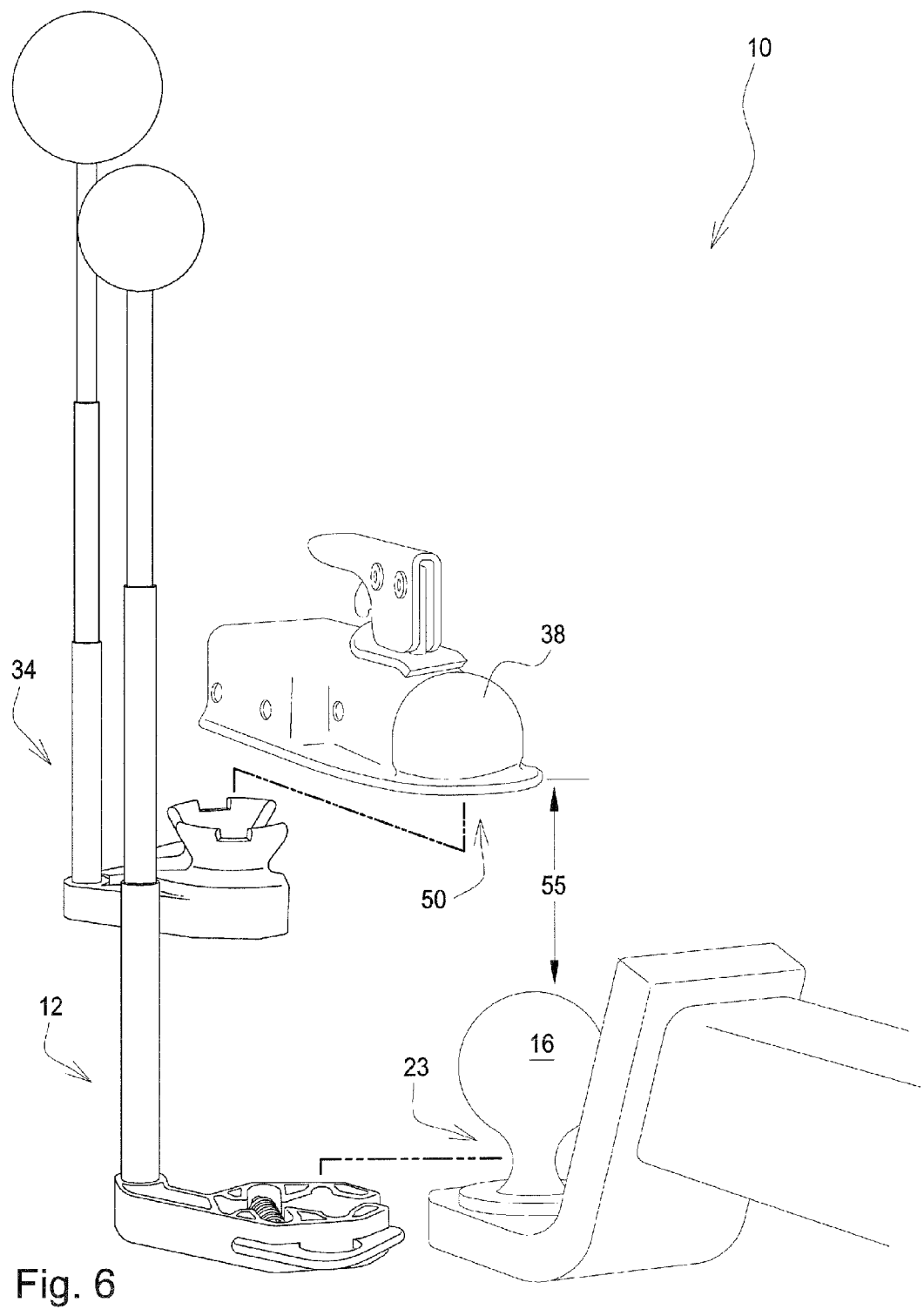
FIG. 6 is a perspective view of a hitch assistance system, according to one embodiment of the invention.
Figure 7:
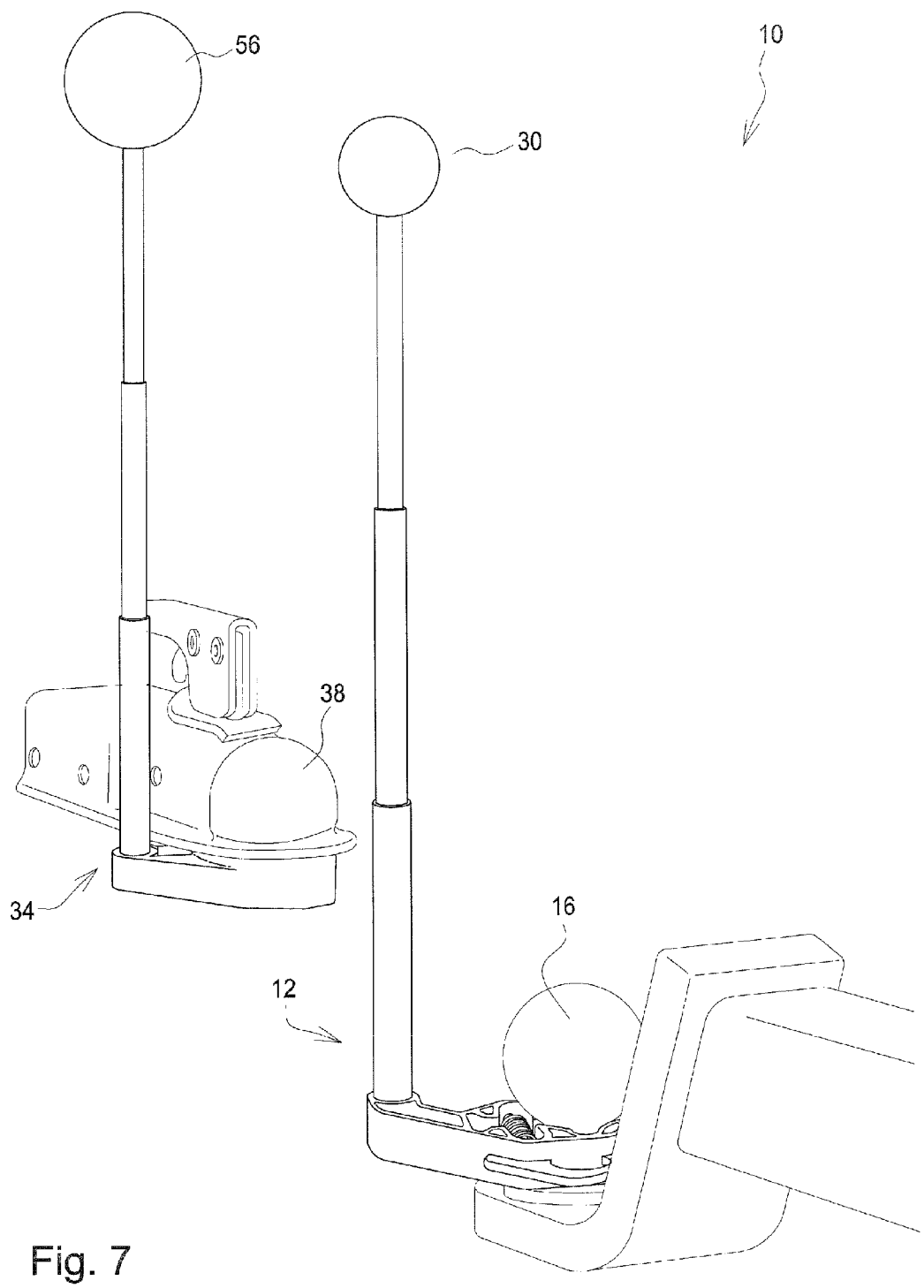
FIG. 7 is a perspective view of a hitch assistance system, according to one embodiment of the invention.

FIGS. 6 and 7 illustrate a perspective view of a hitch assistance system 10, according to one embodiment of the invention, wherein the system 10 includes a tow ball position indicator 12. The tow ball position indicator 12 is configured to facilitate knowing a position of a vehicle's towing ball 16. The tow ball position indicator 12 includes a base member 14 configured to couple to a vehicle's towing ball 16. The base member 14 couples to the base 23 of the towing ball 16. The system 10 also includes a hitch position indicator 34, wherein the hitch position indicator 34 is configured to facilitate knowing a position of a hitch. The hitch position indicator 34 includes a base member 36 configured to couple to a hitch, wherein the base member 36 couples to the interior 50 of a trailer hitch 38. In one embodiment, the trailer hitch 38 is disposed about a distance 55 of about three inches from the towing ball 16, thereby positioning the hitch 38 directly above the towing ball 16 when coupling the trailer to the towing vehicle. Such may be accomplished during a previous disconnection of the tow ball and hitch wherein the system is attached and the hitch is raised until the indicators are substantially aligned.

In operation of one embodiment of the invention, a user couples the tow ball position indicator 12 to a vehicle's towing ball, by disposing the base of the towing ball in between the first arm 20 and the second arm 22 of the gripping member 18. The bias member 24 of the gripping member 18 is configured to expand around the base 23 of the towing ball 16, thereby coupling the tow ball position indicator 12 to the towing ball 16. The user then positions the extension member 26 about either side of the vehicle's towing ball 16, thereby disposing the indicating member 30 to one side of the towing ball 16. Then a user couples a hitch position indicator 34 to a trailer's hitch 38, by disposing the flared extensions 46 of the first arm 42 and the second arm 44 about the interior 50 of the trailer hitch 38. The user presses the first arm 42 and the second arm 44 towards each other and disposes the flared extensions 46 within the interior 50 of a trailer hitch 38 and releases the coupling member 40. The bias member 48 is configured to expand the flared extensions 46 to contact the interior surface of the trailer hitch 38, thereby securing the coupling member 40 within the trailer hitch 38. The user then positions the extension member 52 about either side of the trailer hitch, matching the position of the tow ball position indicator disposed about the towing ball, thereby disposing the indicating member 56 to one side of the trailer hitch 38.

Figure 8:
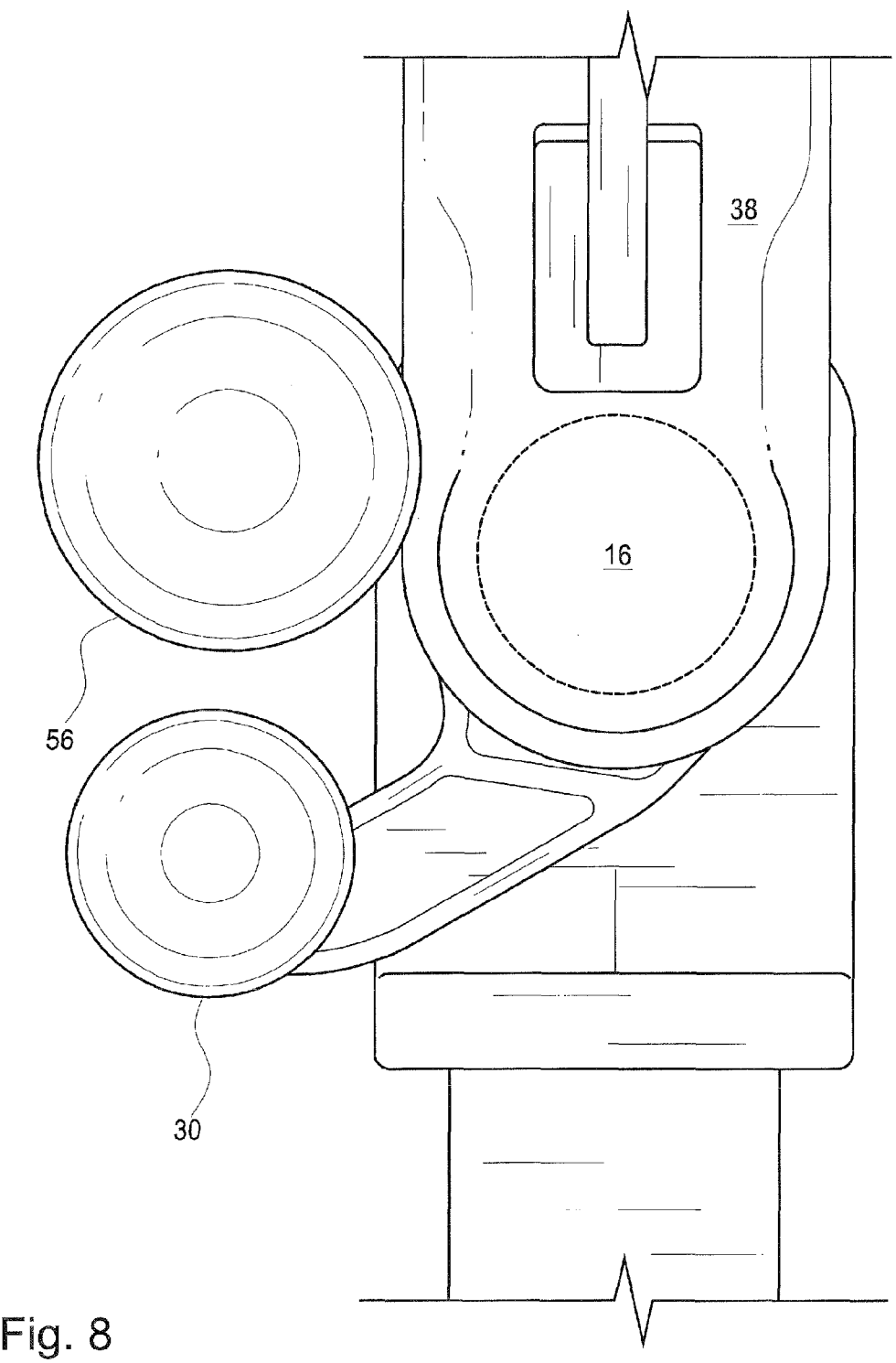
FIG. 8 is top plan view of a hitch assistance system, according to one embodiment of the invention.

FIG. 8 illustrates a top plan view of a hitch assistance system 10, according to one embodiment of the invention, wherein the system 10 includes a tow ball position indicator 12. The tow ball position indicator 12 is configured to facilitate knowing a position of a vehicle's towing ball 16. The tow ball position indicator 12 includes a base member 14 configured to couple to a vehicle's towing ball 16. The system 10 also includes a hitch position indicator 34, wherein the hitch position indicator 34 is configured to facilitate knowing a position of a hitch. The hitch position indicator 34 includes a base member 36 configured to couple to a hitch, wherein the base member 36 couples to the interior of a trailer hitch 38. The hitch assistance system 10 further includes indicating members 30, 56, wherein the indicating member 30, 56 are glow in the dark balls. In addition, the system 10 further includes extension members, wherein each extension member may be sized such that a center of each telescoping staff is offset from a center of each corresponding base member in a substantially equal amount.

In operation of one embodiment of the invention, a user couples the tow ball position indicator 12 to a vehicle's towing ball, by disposing the base of the towing ball in between the first arm 20 and the second arm 22 of the gripping member 18. The bias member 24 of the gripping member 18 is configured to expand around the base 23 of the towing ball 16, thereby coupling the tow ball position indicator 12 to the towing ball 16. The user then positions the extension member 26 about either side of the vehicle's towing ball 16, thereby disposing the indicating member 30 to one side of the towing ball 16. Then a user couples a hitch position indicator 34 to a trailer's hitch 38, by disposing the flared extensions 46 of the first arm 42 and the second arm 44 about the interior 50 of the trailer hitch 38. The user presses the first arm 42 and the second arm 44 towards each other and disposes the flared extensions 46 within the interior 50 of a trailer hitch 38 and releases the coupling member 40. The bias member 48 is configured to expand the flared extensions 46 to contact the interior surface of the trailer hitch 38, thereby securing the coupling member 40 within the trailer hitch 38. The user then positions the extension member 52 about either side of the trailer hitch, matching the position of the tow ball position indicator disposed about the towing ball, thereby disposing the indicating member 56 to one side of the trailer hitch 38.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate indicating members as balls, one skilled in the art would appreciate that the indicating members may vary in size, shape, length, width, height, configuration, design, color, and still perform its intended function.

It is envisioned that the arms of the coupling member and the arms of the gripping member each pivotally couple through direct plastic coupling without mechanical hinges.

Additionally, although the figures illustrate indicating members as balls, one skilled in the art would appreciate that the indicating members each include an audio module, wherein the audio module of the tow ball position indicator displays an audio notification when disposed close to the audio module of the hitch position indicator. In another set of embodiment, indicating members may be of a shape, size, and/or configuration similar to that of a gun sight such that vertical and horizontal alignment may be observed.

Finally, it is envisioned that the components of the device may be constructed of a variety of materials, such as, but not limited to plastic, plastic composite, metal, metal alloys, rubber, rubber composite, textiles, etc. and still perform its intended function.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A hitch assistance system configured to be disposed about the trailer hitch and towing attachment to assist in attaching a trailer to a vehicle, comprising:
   a) a tow ball position indicator configured to facilitate knowing a position of a vehicle's towing ball, comprising:
      a1) a base member configured to couple to a vehicle's towing ball, comprising:
         a11) a gripping member having a first arm and a second arm pivotally coupled one to the other and a bias member coupled between the arms and configured to bias the arms against expansion such that the arms of the gripping member may be disposed on opposite sides of a base of a towing ball and thereby couple thereto; and
         a12) an extension member extending diagonally outward from the gripping member substantially along the plane of the gripping member;
      a2) a telescoping staff coupled to the extension member and extending upwardly therefrom; and
      a3) an indicating member disposed about a top portion of the telescoping member; and
   b) a hitch position indicator configured to to facilitate knowing a position of a hitch, comprising:
      b1) a base member configured to couple to a hitch, comprising:
         b11) a coupling member having a first arm and a second arm pivotally coupled one to the other, a flared extension extending upwardly and outwardly from each arm, and a bias member coupled between the arms and configured to bias the arms against contraction such that the flared extensions of the coupling member may be disposed within an interior of a hitch and thereby couple thereto; and
         a12) an extension member extending diagonally outward from the gripping member substantially along the plane of the gripping member;
      b2) a telescoping staff coupled to the extension member and extending upwardly therefrom; and
      b3) an indicating member disposed about a top portion of the telescoping member.

2. The system of claim 1, wherein the indicating members are glow in the dark balls and the indicating member of the tow ball position indicator is substantially smaller than the indicating member of the hitch position indicator.

3. The system of claim 2, wherein the telescoping staff of the tow ball position indicator is shorter than the telescoping staff of the hitch position indicator when each is fully extended.

4. The system of claim 3, wherein the telescoping staff of the tow ball position indicator is about three inches shorter than the telescoping staff of the hitch position indicator when each is fully extended.

5. The system of claim 4, wherein each extension member is sized such that a center of each telescoping staff is offset from a center of each corresponding base member by a substantially equal amount.

6. The system of claim 5, wherein the arms of the coupling member and the arms of the gripping member are each pivotally coupled through direct plastic coupling without mechanical hinges.

7. The system of claim 6, wherein each bias member includes a central support stump disposed therein and configured to facilitate proper orientation of the bias member.

8. The system of claim 7, wherein the tow ball position indicator includes a distance between the first arm and the second arm, wherein the distance is smaller than a width of a vehicle's towing ball.

9. The system of claim 8, wherein the hitch position indicator includes a distance between the first arm and the second arm, wherein the distance is larger that the width of the interior of a trailer hitch.

10. A hitch assistance system configured to be disposed about the trailer hitch and towing attachment to assist in attaching a trailer to a vehicle, comprising:
   a) a tow ball position indicator configured to facilitate knowing a position of a vehicle's towing ball, comprising:
      a1) a base member configured to couple to a vehicle's towing ball, comprising:
         a11) a gripping member having a first arm and a second arm pivotally coupled one to the other and a bias member coupled between the arms and configured to bias the arms against expansion such that the arms of the gripping member may be disposed on opposite sides of a base of a towing ball and thereby couple thereto; and
         a12) an extension member extending diagonally outward from the gripping member substantially along the plane of the gripping member;
      a2) a telescoping staff coupled to the extension member and extending upwardly therefrom; and
      a3) an indicating member disposed about a top portion of the telescoping member; and
   b) a hitch position indicator configured to facilitate knowing a position of a hitch, comprising:
      b1) a base member configured to couple to a hitch, comprising:

b11) a coupling member having a first arm and a second arm pivotally coupled one to the other, a flared extension extending upwardly and outwardly from each arm, and a bias member coupled between the arms and configured to bias the arms against contraction such that the flared extensions of the coupling member may be disposed within an interior of a hitch and thereby couple thereto; and a12) an extension member extending diagonally outward from the gripping member substantially along the plane of the gripping member;

b2) a telescoping staff coupled to the extension member and extending upwardly therefrom; and b3) an indicating member disposed about a top portion of the telescoping member; and b3) wherein the telescoping staff of the tow ball position indicator is shorter than the telescoping staff of the hitch position indicator when each is fully extended.

11. The system of claim 10, wherein the indicating members are glow in the dark balls and the indicating member of the tow ball position indicator is substantially smaller than the indicating member of the hitch position indicator.

12. The system of claim 10, wherein the telescoping staff of the tow ball position indicator is about three inches shorter than the telescoping staff of the hitch position indicator when each is fully extended.

13. The system of claim 10, wherein each extension member is sized such that a center of each telescoping staff is offset from a center of each corresponding base member by a substantially equal amount.

14. The system of claim 10, wherein the arms of the coupling member and the arms of the gripping member are each pivotally coupled through direct plastic coupling without mechanical hinges.

15. The system of claim 10, wherein each bias member includes a central support stump disposed therein and configured to facilitate proper orientation of the bias member.

16. The system of claim 10, wherein the tow ball position indicator includes a distance between the first arm and the second arm, wherein the distance is smaller than a width of a vehicle's towing ball.

17. The system of claim 10, wherein the hitch position indicator includes a distance between the first arm and the second arm, wherein the distance is larger that the width of the interior of a trailer hitch.

18. A hitch assistance system configured to be disposed about the trailer hitch and towing attachment to assist in attaching a trailer to a vehicle, comprising:

a) a tow ball position indicator configured to facilitate knowing a position of a vehicle's towing ball, comprising:

a1) a base member configured to couple to a vehicle's towing ball, comprising:

a11) a gripping member having a first arm and a second arm pivotally coupled one to the other and a bias member coupled between the arms and configured to bias the arms against expansion such that the arms of the gripping member may be disposed on opposite sides of a base of a towing ball and thereby couple thereto; and a12) an extension member extending diagonally outward from the gripping member substantially along the plane of the gripping member;

a2) a telescoping staff coupled to the extension member and extending upwardly therefrom; and a3) an indicating member disposed about a top portion of the telescoping member; wherein the tow ball position indicator includes a distance between the first arm and the second arm, wherein the distance is smaller than a width of a vehicle's towing ball; and b) a hitch position indicator configured to to facilitate knowing a position of a hitch, comprising:

b1) a base member configured to couple to a hitch, comprising:

b11) a coupling member having a first arm and a second arm pivotally coupled one to the other, a flared extension extending upwardly and outwardly from each arm, and a bias member coupled between the arms and configured to bias the arms against contraction such that the flared extensions of the coupling member may be disposed within an interior of a hitch and thereby couple thereto;

wherein the arms of the coupling member and the arms of the gripping member are each pivotally coupled through direct plastic coupling without mechanical hinges; wherein each bias member includes a central support stump disposed therein and configured to facilitate proper orientation of the bias member; and a12) an extension member extending diagonally outward from the gripping member substantially along the plane of the gripping member; wherein each extension member is sized such that a center of each telescoping staff is offset from a center of each corresponding base member by a substantially equal amount;

b2) a telescoping staff coupled to the extension member and extending upwardly therefrom; wherein the telescoping staff of the tow ball position indicator is shorter than the telescoping staff of the hitch position indicator when each is fully extended; wherein the telescoping staff of the tow ball position indicator is about three inches shorter than the telescoping staff of the hitch position indicator when each is fully extended; and b3) an indicating member disposed about a top portion of the telescoping member; wherein the indicating members are glow in the dark balls and the indicating member of the tow ball position indicator is substantially smaller than the indicating member of the hitch position indicator; wherein the hitch position indicator includes a distance between the first arm and the second arm, wherein the distance is larger that the width of the interior of a trailer hitch.

* * * * *